Dec. 31, 1929.  W. E. SWERN  1,741,208
PROCESS OF FORMING DRUM TIRES
Filed June 30, 1924   3 Sheets-Sheet 1

INVENTOR.
WILLIAM E. SWERN.
BY
ATTORNEYS.

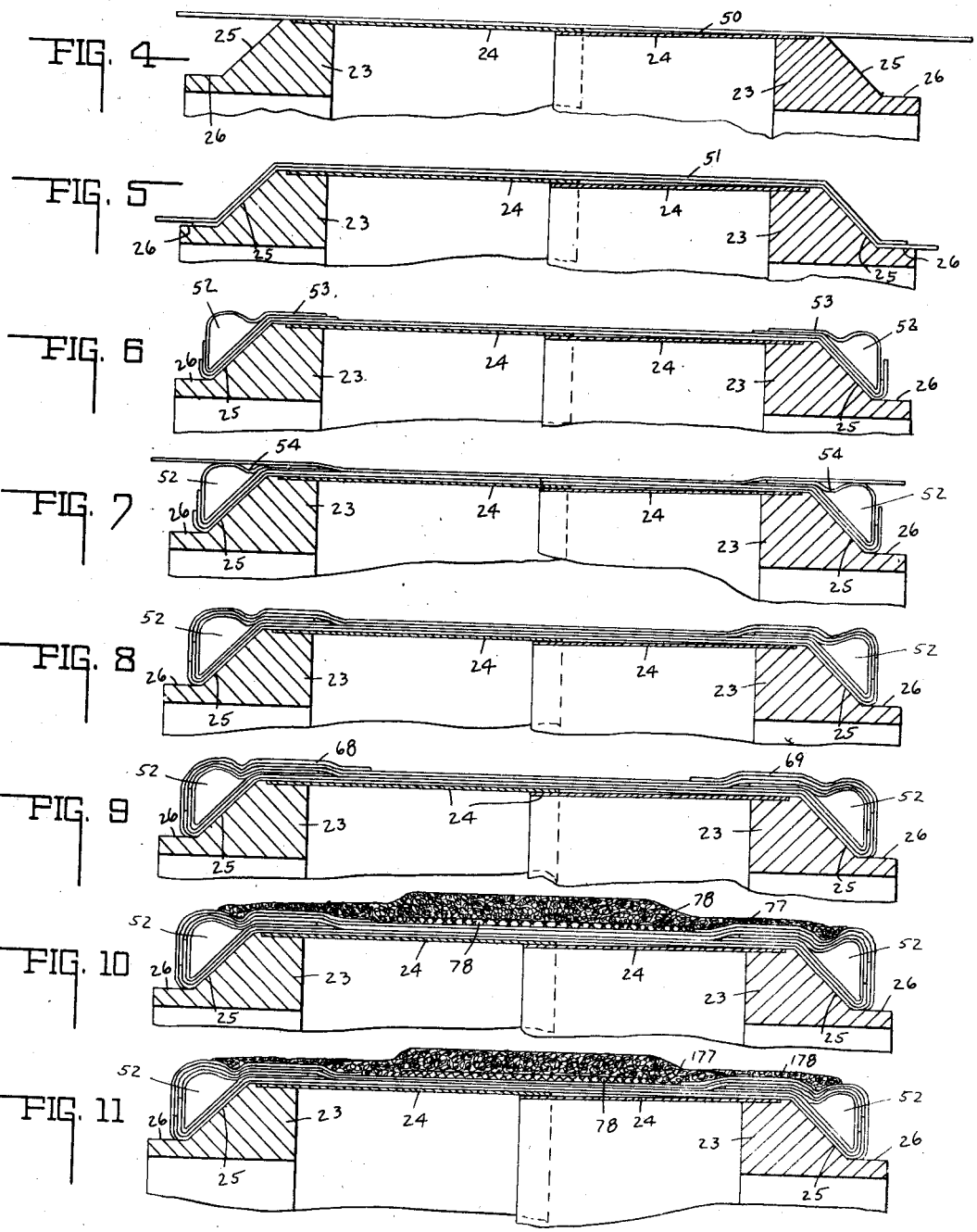

Dec. 31, 1929. W. E. SWERN 1,741,208
PROCESS OF FORMING DRUM TIRES
Filed June 30, 1924 3 Sheets-Sheet 3
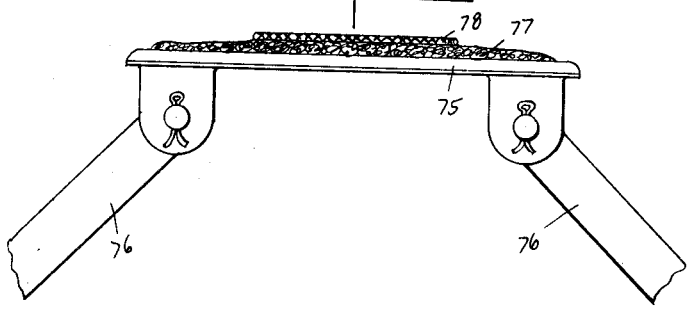
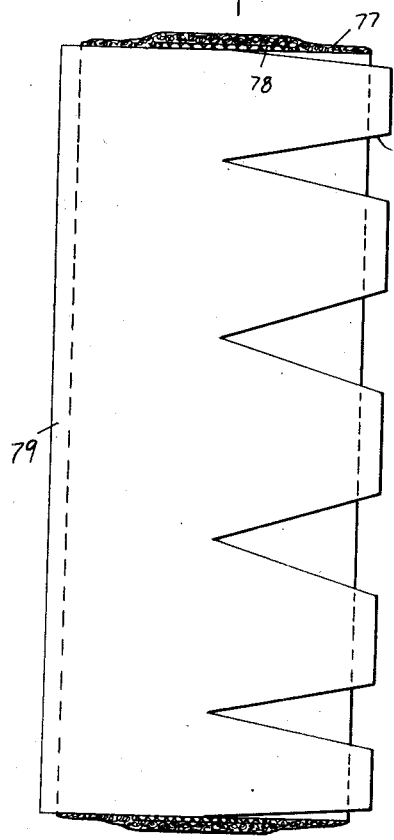
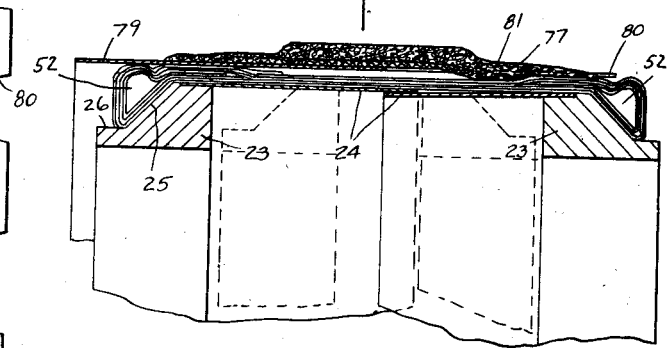
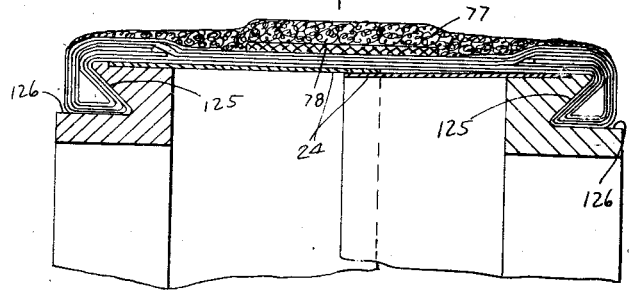
INVENTOR.
WILLIAM E. SWERN.
BY
ATTORNEYS.

Patented Dec. 31, 1929.

1,741,208

UNITED STATES PATENT OFFICE

WILLIAM E. SWERN, OF KOKOMO, INDIANA

PROCESS OF FORMING DRUM TIRES

Application filed June 30, 1924. Serial No. 723,353.

This invention relates to a full drum type tire and the process of forming the same.

The chief object of the invention is to construct an improved drum type tire casing which is substantially completed when removed from the drum for subsequent deformation and curing.

Another object of the invention is to improve the construction in general of drum type tire casings, by an improved process.

The present invention contemplates the production of either the clincher or straight side tire casing by the use of the minimum number of dissimilar widths of ply material; or in other words, the invention contemplates the use of ply material of substantially the same width which heretofore has never been utilized, for ply material has always been of dissimilar widths. The present invention contemplates the incorporation of a breaker strip or equivalent construction into the tire in such a manner that the breaker strip will not be broken or excessively stressed when the tire is deformed.

The full nature of the invention will be understood from the accompanying drawings and the following description and claim.

Figure 1:
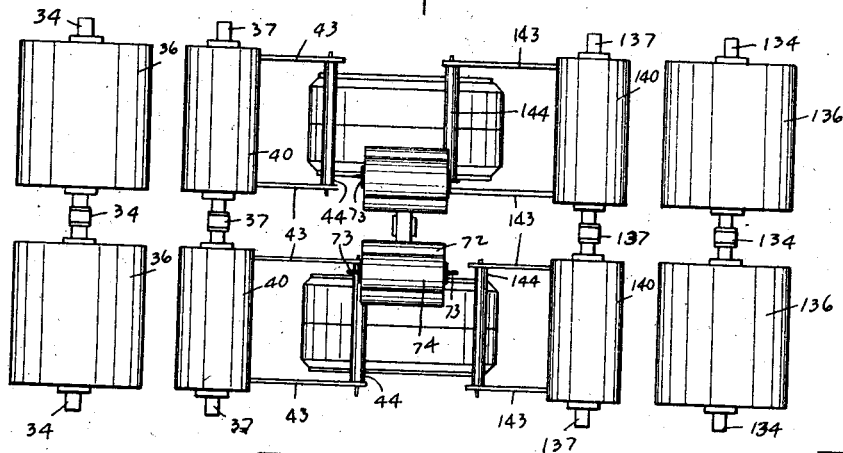
Figure 2:
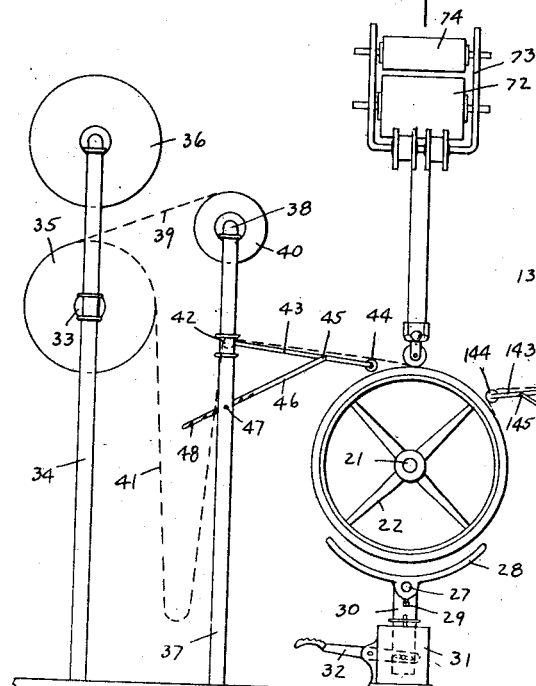
Figure 3:
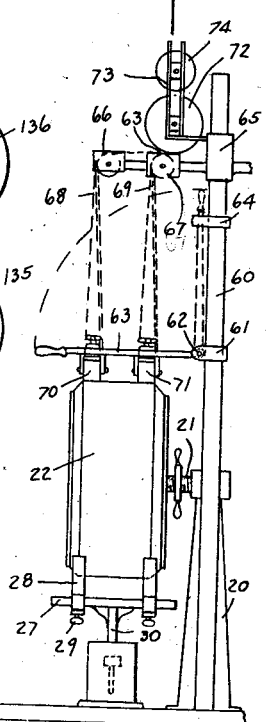

In the drawings, Fig. 1 is a top plan view of a tire building machine showing the same in multiple, that is, adapted to build simultaneously two casings upon two drums. Fig. 2 is a side elevational view of the same. Fig. 3 is an end elevational view of half of the device. Fig. 4 is a transverse sectional view of a portion of the drum showing a portion of the construction thereof and the application of the first ply. Fig. 5 shows the positioning of the first ply and the application and positioning of the second ply. Fig. 6 is a similar view of the same parts showing the positioning of the beads and the association of the first two plies therewith. Fig. 7 is a similar view showing the application of an additional ply. Fig. 8 is a view similar to Fig. 7 but showing the last-mentioned ply properly positioned. Fig. 9 is a view similar to Fig. 8 and shows the application of the chafer strip. Fig. 10 is a view similar to Fig. 9 and shows the application of the breaker strip and tread, the latter being of the one-color type. Fig. 11 is a view similar to Fig. 10 and herein illustrates the casing as having colored side walls or of the multi-color type. Fig. 12 indicates a portion of the auxiliary drum upon which the tread and breaker strip portion is formed. Fig. 13 illustrates the breaker strip and tread portion in position upon the transfer drum or sleeve. Fig. 14 is a view similar to Figs. 4 to 11 inclusive but shows the application of the breaker strip and tread portion to the partially formed drum type casing by means of the intermediate drum or sleeve. This figure illustrates a step between Figs. 9 and 10 and 11. Fig. 15 is a view similar to Fig. 11 but illustrates a straight side tire, whereas the beforementioned figures all illustrate a clincher type tire.

The present invention contemplates the construction of a tire casing upon a drum, its subsequent removal when the casing is entirely built, and thereafter its deformation and curing to form a completed tire casing. The invention solves two difficulties heretofore encountered in the art of making tires. One of these difficulties is that various widths of fabric, and by fabric it is intended to include corded material, have been utilized in the same tire, whereas the present invention contemplates the use of a standard width of fabric for the same tire. Another defect which has been found in the building of drum type tires is that in those types of tires wherein the drum or cylindrical casing is expanded into tire formation, the breaker strip quite frequently breaks when unduly stressed instead of serving its normal function.

Reference will first be had to Figs. 1 to 3 inclusive. In Fig. 1 there is illustrated a skeletonized double type of tire building device. In said figures, 20 indicates a standard which supports a lateral or horizontal shaft 21 upon which is supported a drum 22. This drum, see Figs. 4 to 11 inclusive, includes a pair of annular side members 23 which are joined together to form a drum or cylinder by a pair or plurality of telescoping cylindrical sections 24. As shown clearly in Figs. 4 to 11 inclusive, the side members 23 are provided with an inclined face 25 and a lateral annular ledge 26. A comparison of Figs. 14 and 15 will indicate that the side members 23 may be otherwise formed, and in Fig. 15 the inclined face 125 extends inwardly instead of outwardly, although both faces extend downwardly. The lateral edge 126 is similar to the ledge 26. With the exception of the construction of the side members 23 as indicated in Figs. 14 and 15, the construction of straight side and clincher type tires is substantially the same when produced by this process. For convenience, herein the invention is illustrated as associated with the clincher type tires. Positioned beneath the drum 22 having the parts 23 to 26 inclusive and rotatably mounted upon the shaft 21 is a transverse support 27 which herein is shown provided with a plurality of arcuate spading members 28 which are adjustably positioned, although rigidly secured upon said transverse support by suitable means, such as indicated by the numeral 29. The transverse support 28 is shown supported by the stem 30, and this stem 30 is slidably supported in a bracket or base 31 in which is mounted a lever 32, suitably connected to said standard 30 for reciprocating the spading members 28. Herein the lever 32 is operable by the foot of the operator. Positioned at one side of and upon an axis parallel to the shaft 21 is a roll support 33 suitably supported by a frame 34. The roll support 33 supports a fabric roll 35 of a predetermined width for a particular size of tire to be constructed. Positioned in the same frame 34 above the roll 35 is an auxiliary or replenishing roll 36. Interposed between the frame 34 and the drum 32 is another frame 37. This frame 37 supports near its upper end a roll support 38 which is adapted to receive the spacing medium or strip 39 interposed between the layers of the fabric in the roll 35, and this strip is receivable on the roll 40 as the fabric 41 is removed from the fabric roll.

Also supported by the intermediate frame 37 is a roller 42 or equivalent construction over which the fabric is passed and between the roll 35 and roller 42. The fabric includes a loop of sufficient length so that substantially uniform tension will be applied to the fabric when it is applied to the drum. Also supported by the frame 37 is a lever 43 which carries in its free end a roll 44. The fabric is also supported upon this roll prior to its engagement with the drum 22. Between the ends of the lever 43, there is pivotally supported at 45 another member 46 which constitutes an adjustable brace. The pin 47 carried by the frame 37 is adapted to engage one of the notches 48 for adjustably positioning the roll 44 adjacent the drum 22.

Upon the opposite side of the drum and substantially parallel to the before-mentioned construction is an identical construction herein indicated by the same numerals increased by 100, to-wit, 133 to 148 inclusive. This construction is adapted to discharge a strip of fabric 141 of the same width as the strip of fabric 41 upon the drum at some distance from the point that the fabric 41 engages said drum. In making cord tires, the best practice is to have the cords positioned in biased relation. It is also excellent practice to have the cords of two adjacent plies biased with respect to each other, generally about 90 degrees. The fabric strips 41 and 141 are offset slightly from each other, such offsetting being shown clearly in Fig. 5. In this manner rolls of the same width of fabric may be utilized to build a tire casing. Such standardization has heretofore never been performed. Another important consideration which the foregoing offsetting secures is the interlocking and breaking of joints with the resultant increased strength secured thereby.

Before proceeding to a further description of the apparatus shown in Figs. 1 to 3 inclusive, a description of the process as practiced and utilizing the previously described elements will be given. The strip 41 is applied to the drum 22 and forms a layer 50 thereon which is offset with respect to said drum. The edges are stitched or pressed down over the inclined wall portion 25 by the spading tool 28. At the same time that the first ply 50 is being applied to the drum, the second ply 51 is also applied thereto, but complementarily offset so as to lie when stitched or pressed down by the spading tool as shown in Fig. 5. The rotation of the drum 22 is stopped from time to time and the edges are stitched or pressed down so that when the drum has rotated sufficiently, all of the plies applied to the drum have been stitched down and into position. The drum thereafter is revolved again and the stitching or pressing is repeated until the plies are spliced together and completely stitched or pressed down. Each ply is, as shown, offset about one-quarter of an inch. Thereafter, to each of the inclined portions of the drum there is applied a bead 52 which herein is shown provided with the flipper strips 53. These flipper strips are positioned upon the surface of the drum and serve to anchor the bead 52 to the first two plies upon the drum. If the flipper strips are not provided, but the beads are plain, a chafing strip is first placed around the drum and stitched in place where the bead is to be positioned. The bead is thereafter positioned and the chafing strip is turned over the bead and folded back upon the drum, whereupon it is stitched into position. The resultant effect in either instance is the same and the construction of the tire up to this point is illustrated in Fig. 6. Following this a third ply of fabric is applied to the drum, and it is so applied that the positioning of the third ply forms an abutting joint with the second ply, see Fig. 8. After the third ply has passed the starting point of the fourth ply application, the latter is also applied and it is also offset in such a manner that the ends thereof abut with the ends of the first ply.

In pressing down or stitching the third and fourth plies it is to be understood that the spading tool 28 first stitches the plies into the groove 54 of the bead. After this has been accomplished, the spading tools 28 are adjusted into a second position and pressed down the remainder of the ply over the outside of the bead and extend out to the toe thereof and into the abutting position shown in Fig. 8. As shown clearly in this figure, the abutting joints are broken.

Reference will now be had to Figs. 1 to 3 inclusive, wherein there is illustrated a medianly positioned support 60 which carries a bracket 61 that pivotally supports at 62 a lever 63. The lever 63 is normally held in the retracted position by a spring clip 64, said retracted position being shown by the dotted line position in Fig. 3, and the full lines indicating the operative position of the lever. Positioned above the foregoing is a bracket 65, which in turn provides bearings for the rollers 66 and 67 that are supplied with chafing strips 68 and 69, which chafing strips pass over said rollers 66 and 67 and are associated with the rollers 70 and 71 respectively adjustably mounted upon the lever 63. The strips 68 and 69 are included in the roll 72 carried in a bracket 73 supported by the bracket 65. The spacing material between the layers of chafing strips in the roll 72 is receivable by the superposed roll 74. When the chafing strips are to be applied to the opposite sides of the drum, the lever 63 is positioned as shown in full lines in Figs. 2 and 3; and after said strips are applied, the lever is returned to the dotted line position. Fig. 9 illustrates the chafer strip applied to the drum from a point well above the bead line on the tire and extending to the toe thereof passing around the bead.

Reference will now be had to Figs. 12 and 13. In these figures there is illustrated a drum 75 provided with suitable actuating mechanism 76, whereby the drum is expansible and contractible. Fig. 12 shows the same in the expanded position. With the drum 75 in the contracted position, there is applied the tread portion of the tire 77. Thereafter, the tread portion of the tire is extended by expanding the drum 75 and while said drum and tread are in the extended or expanded position, there is centrally applied thereto the breaker strip 78. After the ends have been spliced and the breaker strip has been stitched firmly to the tread surface, the drum 75 is contracted, whereupon the elasticity of the tread rubber causes the breaker to be compressed into a band having substantially the same diameter of the tread before the latter was stretched or expanded. It is to be understood that the breaker strip 78 in its reversed position, as shown in Fig. 12, has the normal diameter of the breaker strip when in tire casing formation.

After forming the combination tread and breaker portion of the tire, the same is removed from the expansible and contractible drum construction or surface 75 and it is turned inside-out and positioned upon the sheet metal cylindrical surface of the tread applying sleeve or device 79. Said device is provided along one edge with a plurality of notches 80, the purpose of which will hereinafter appear more fully. As shown clearly in Fig. 14, the drum or cylinder 79 is telescoped upon the drum 22 and that portion of the tire heretofore described as previously applied to the drum. When positioned as shown in Fig. 14, the tread 77 is pressed through the perforations or notches 80 into engagement with that portion of the tire upon the drum. The cylindrical surface 79 is thereupon withdrawn, and since as shown at 81 the portion of the tread that projected through the notches 80 adheres to the tire previously formed, said adherence will secure the main portion of the tread in position upon the tire upon the withdrawal of said cylindrical surface 79. Following the withdrawing of said sleeve the entire tread is pressed down or stitched to the casing portion previously formed. It will be observed by comparing Figs. 12, 13 and 14 that the breaker strip 78 is positioned within the tread in the two latter figures. The breaker strip in these two figures is in the contracted state, its normal state being assumed by the strip when the tire casing is completed and subsequently deformed into tire casing formation. When thus deformed into tire casing formation, the breaker strip as will be readily apparent is subjected to no stresses, due to the formation of the tire casing from that of the drum type to that of the completed tire. Heretofore subjection to undue stress has been one serious cause of failure in the breakers of drum type tires. Thus the strength of the breaker strip is unimpaired by reason of deformation of the drum type tire into the tire casing formation, and thus the breaker strip can serve its normal and natural function with its normal strength unimpaired. The complete drum formation of the tire is shown in Fig. 10.

When it is desired to form a multi-colored tire, that is, having the side wall different from the tread, it is to be understood that the tread previously described in Figs. 12 to 14 and illustrated also in Fig. 10 includes the side walls. In Fig. 11 said tread indicated by the numeral 177 does not include the side walls, and herein said side walls are indicated by the numeral 178, the tread being indicated by the numeral 78. These may be applied to the drum in much the same manner that the plies are applied thereto. They are, of course, stitched and pressed down into position.

From the foregoing it will be understood that there is completely formed upon a drum a tire casing in drum formation. This tire may be of the clincher or straight side type. It also may have side walls and treads of different colors and materials. The tire also may include beads provided with flipper strips or the latter may be separable and applied independently of the beads. All of the beforementioned modified forms of tires may be formed by the foregoing process, and it is to be further understood that the width of the casing can also be adjusted so that one drum 22 may form without very great adjustment several sizes of tire casings, each casing, however having the same bead diameter. Thus for example, a 23 inch drum may be adjusted to make casings for a 23 inch rim diameter, which rim would be adapted to take tires of the following sizes: 30 x 3½, 31 x 4, 32 x 4½ and 33 x 5 inch tires by the simple expedient of making each of the tire casings substantially proportional to the diameters, that is, 3½ x 4 and 5 inches. This adjustment is secured by the relative movement of the telescopic sections 24.

Following the formation of the full and complete drum type casing in drum formation, the side members 23 of the drum 22 are moved towards each other relatively and the casing removed. Thereafter the casing may be deformed into tire casing formation by any suitable means such as by a mechanical means or by fluid pressure. After deformation, the tires are cured in the usual manner.

The invention claimed is:

The process of forming a drum type tire having a tread and breaker strip including forming a cylindrical tread portion in inverted relation and of a diameter substantially that of the bead diameter of the tire, expanding said tread to a diameter approximately that of the completed tire casing, securing thereto a breaker strip, and thereafter turning said tread and strip inside-out.

In witness whereof, I have hereunto affixed my signature.

WILLIAM E. SWERN.